US005687698A

United States Patent [19]

Mastro et al.

[11] Patent Number: 5,687,698

[45] Date of Patent: Nov. 18, 1997

[54] EXHAUST GAS RECIRCULATION VALVE

[75] Inventors: Noreen Louise Mastro, Rochester; Jeffrey David Rohe, Caledonia, both of N.Y.

[73] Assignee: General Motors Corporation, Detroit, Mich.

[21] Appl. No.: 703,149

[22] Filed: Aug. 29, 1996

[51] Int. Cl.$^{6}$ .............................. F02M 25/07; F16K 31/06

[52] U.S. Cl. .................... 123/571; 251/129.15; 335/255; 335/281

[58] Field of Search ........................ 123/571; 251/129.15, 251/129.16, 129.17; 335/219, 220, 221, 236, 255, 278, 279, 281

[56] References Cited

U.S. PATENT DOCUMENTS

| | | | |
|---|---|---|---|
| 5,020,505 | 6/1991 | Grey et al. | 123/571 |
| 5,066,980 | 11/1991 | Schweizer | 335/281 |
| 5,094,218 | 3/1992 | Everingham et al. | 123/571 |
| 5,129,623 | 7/1992 | Lockwood | 123/571 |
| 5,435,519 | 7/1995 | Everingham | 251/129.15 |
| 5,460,146 | 10/1995 | Frankenberg | 251/129.15 |
| 5,467,962 | 11/1995 | Bircann et al. | 251/129.15 |
| 5,494,255 | 2/1996 | Pearson et al. | 251/129.15 |
| 5,588,414 | 12/1996 | Hrytzak et al. | 123/571 |
| 5,593,132 | 1/1997 | Hrytzak | 251/129.15 |

*Primary Examiner*—Willis R. Wolfe

*Attorney, Agent, or Firm*—Karl F. Barr, Jr.

[57] ABSTRACT

An exhaust gas recirculation valve meters exhaust gas to the intake of an internal combustion engine. The valve includes an electromagnetic solenoid actuator having a magnetic circuit defined by a primary and a secondary pole piece. The pole pieces define an axial chamber in which is disposed an axially moveable armature and an associated valve member. The primary pole piece has a center pole member including a cylindrical inner wall which is open at a first end for receiving the armature. The armature and the cylindrical inner wall establish a fixed, radially extending primary air gap for flux passage while the outer wall extends in an outward taper from the first, open end of said center pole member and operates to increase the mass of the pole piece through which the magnetic circuit operates as the armature moves from the first, open end of the center pole member towards the second end. The secondary pole piece has a center pole member which includes a cylindrical inner wall, open at a first end for receiving the moveable armature and which is located in spaced opposing relationship to the first, open end of the primary pole to define a pole-to-pole gap therebetween. The armature and the cylindrical inner wall of the secondary pole define fixed, radially extending primary air gap for flux passage thereacross, and the outer wall extends in an outward taper from the first, open end. The outwardly tapering walls of primary and secondary poles operate to minimize the pole-to-pole gap through a minimization in opposing surface area therebetween allowing the length of the secondary pole and the surface area between secondary pole member and the armature to be maximized. The result is a minimization of the reluctance across said radial air gap and a maximization of the flux passage through the armature.

1 Claim, 2 Drawing Sheets

EXHAUST GAS RECIRCULATION VALVE

TECHNICAL FIELD

The invention relates to a valve assembly for metering exhaust gas to the intake system of an internal combustion engine.

BACKGROUND OF THE INVENTION

Exhaust gas recirculation (EGR) is employed in connection with internal combustion engines to aid in reducing regulated emissions by metering exhaust gas to the intake manifold for mixing with incoming charge air prior to delivery to the engine combustion chamber. An exhaust gas recirculation valve is typically used to control the quantity of exhaust gas delivered to the intake based on the operating conditions of the engine. A state of the art EGR valve utilizes a linear solenoid actuator to move a biased pintle or poppet valve, thereby metering the flow of hot exhaust gas to the intake. In order to rapidly manipulate the valve member against its normally closed bias, as well as the gas load forces caused by the differential pressure between the exhaust and intake manifolds, the solenoid actuator must be powerful, as well as energy efficient, small, light weight and environmentally durable.

In the exhaust gas recirculation valve set forth in U.S. Pat. 5,020,505 issued Jun. 04, 1991, to Grey et al., an electromagnetic solenoid actuator includes primary and secondary pole pieces which define an axially extending chamber in which is disposed a reciprocably moveable armature. The primary and secondary pole pieces are configured as cylindrical annulus so as to define a fixed air gap between the inner walls thereof and the moveable armature. A pole-to-pole air gap is defined between opposing end faces of the pole pieces intermediate of the cylindrical chamber. In order to provide a linear function to the operation of the actuator, the outer wall of the primary pole piece is tapered outwardly in the direction of armature movement such that, as the armature moves, the mass of the pole piece through which magnetic flux is forced to pass increases so as to control the rate of magnetic saturation resulting in a linear displacement versus current characteristic.

In the exhaust gas recirculation valve set forth in pending U.S. Patent Application Ser. No. 08/599,538 filed Feb. 6, 1996 in the name of Nehl et al, a linear solenoid actuated EGR valve is disclosed having an improved linear solenoid actuator in which the cylindrical inner wall of the primary pole piece is inwardly tapered in the opening direction of the armature so as to define a conical end of the axial chamber. The conical chamber end operates with a similarly tapered armature end portion to establish a secondary air gap which functions to provide additional opening force on the armature across its entire range of motion and, more importantly, as the armature nears full displacement at the closed end of the primary pole piece.

In the linear solenoid actuators described above, the intensity of the magnetic flux transmitted from the secondary pole piece through the armature is inversely proportional to the reluctance of the cylindrical air gap defined by the overlapping of the two components. This reluctance is directly proportional to the thickness of the air gap and inversely proportional to the surface area presented between the components across the air gap. For a fixed air gap thickness of the type used in the valves described, improvement in the flux transmission is limited by the surface area of the armature-to-secondary pole overlap. Within a given package size, lengthening the lower portion of the secondary pole piece by shortening the pole-to-pole gap can affect an increase in the overlap area. However, closing the pole-to-pole gap results in a lowering of the reluctance across the pole tips, allowing leakage flux to be diverted across the pole-to-pole gap. This "short circuiting" of the magnetic flux is detrimental to the solenoid axial force generation, as it weakens the available flux from the armature to the primary pole.

SUMMARY OF THE INVENTION

The present invention is directed to an improved exhaust gas recirculation (EGR) valve for use in supplying exhaust gas to the combustion air stream of an internal combustion engine. It is an object of the present invention to decrease the armature to secondary pole piece reluctance so as to promote an increase in flux transmission across the fixed air gap between the actuator components thereby resulting in an increase in solenoid axial force generation. The reduction in armature to secondary pole piece reluctance is brought about through an increase in the surface area presented between the two components across the working air gap while minimizing any increase in the leakage flux passing across the pole-to-pole gap at the opposing ends of the primary and secondary pole pieces.

In the actuator of the present invention the secondary pole piece includes a tapered portion at its end adjacent the primary pole piece. The taper is located along the outside wall of the secondary pole piece and decreases in the axial direction towards the primary pole piece. The end of the secondary pole piece which opposes the primary pole piece across the pole-to-pole gap has a reduced thickness, similar to that of the tapered end of the primary pole piece. The tapered end portion of the secondary pole piece allows the pole-to-pole gap to be minimized thereby allowing maximization of the surface area between the secondary pole piece and the armature through the lengthening of the secondary pole piece inner wall. Conversely, the tapering of the secondary pole piece end, opposing the primary pole piece across the pole-to-pole gap, increases the reluctance across the pole-to-pole gap thereby minimizing the flux leakage across the gap and preserving the flux path through the armature, resulting in an increase in the overall level of axial magnetic force generated by the actuator.

Other objects and features of the present invention will become apparent by reference to the following description and to the drawings.

DESCRIPTION OF THE PREFERRED EMBODIMENT

Figure 1:
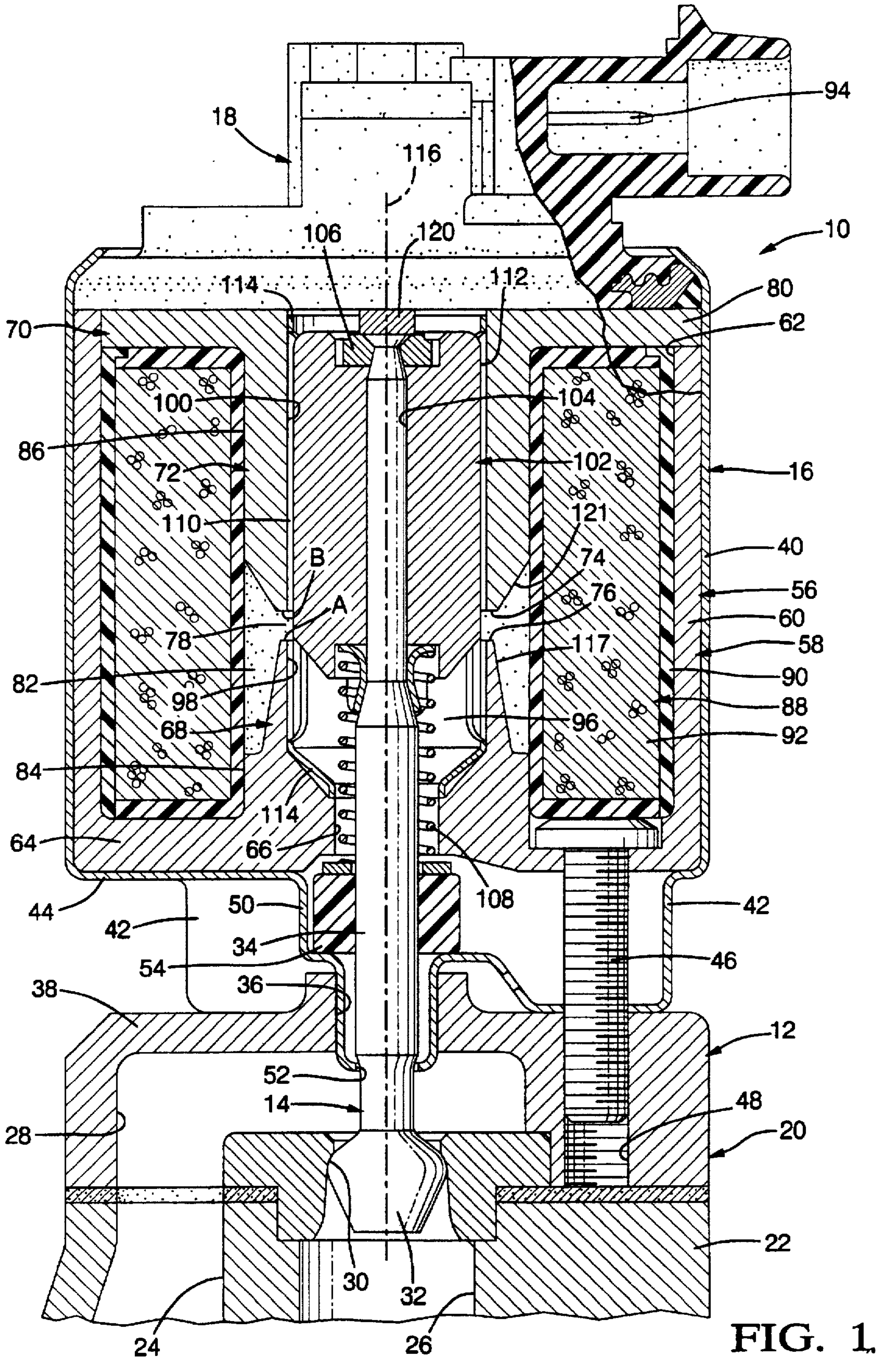
FIG. 1 is a sectional view of an exhaust gas recirculation valve embodying features of the present invention.

In FIG. 1 there is shown a linear solenoid actuated exhaust gas recirculation (EGR) valve, designated generally as 10, for delivery of exhaust gas to the combustion air charge of an internal combustion engine. The EGR valve 10 includes a base assembly 12, a valve assembly 14, an electromagnetic solenoid actuator 16 and a pintle position sensor 18. The base assembly, as illustrated in FIG. 1 includes a housing 20 which mounts the valve 10 to the engine 22 and through which exhaust gas is allowed to flow through openings 24 and 26 which are interconnected through an exhaust passage 28. A valve seat 30 surrounds opening 24 and receives a poppet valve member 32 which moves into and out of engagement therewith to regulate the flow of exhaust gas through the housing 20. The valve assembly 14 also includes a valve stem 34 which extends through an opening 36 in the top 38 of the housing 20 for attachment to the actuator 16.

The actuator 16 includes a cylindrical actuator housing 40 with integral hollow support members 42 extending from the bottom 44 for engagement with the top 38 of the base housing 20. The support members 42 operate to insulate the hot base housing 20 from the actuator 16 while accommodating fasteners such as bolts 46 which, when engaged with corresponding threaded openings 48 in the top of base housing 20 operate to retain the actuator 16 in rigid engagement therewith. Also extending from the bottom 44 of the cylindrical actuator housing 40 is a stepped cylindrical extension 60 which is configured to slidingly and sealingly engage the valve stem opening 36 in the top 38 of the base housing 20. An opening 52 in the extension 50 allows the valve stem 34 to pass coaxially therethrough and into the interior of the cylindrical actuator housing 40 where it is supported by a bearing member 54 disposed in the stopped extension 50.

The actuator 16 further includes a linear solenoid 56, disposed within the interior of the cylindrical actuator housing 40. The solenoid 56 has a cup shaped primary pole piece 58 which is slidingly inserted into the housing interior and is defined by axially extending cylindrical sides 60 defining an open upper end 62, as viewed in the Figures, an annular bottom portion 64 defining a centrally disposed opening 66 for the passage of the valve stem 34, and a cylindrical primary pole 68 disposed about the opening 66 and extending axially from the bottom portion 64 to terminate intermediate of the bottom and the open upper end 62. A secondary pole piece 70 includes a cylindrical secondary pole 72 which extends into the interior of the primary pole piece in coaxial relationship to the primary pole 68. The terminal end 74 of the secondary pole 72 is located in spaced relationship to the terminal end 76 of the primary pole 68 so as to define a pole-to-pole gap 78 therebetween. A flange 80 extending outwardly from the upper end of the secondary pole 70 operates to close the open upper end 62 of the primary pole piece 58. When assembled, the primary and secondary pole pieces define, an annular space 82 between the outer walls 84 and 86 of the primary and secondary poles 68 and 72, respectively, and the axial cylindrical sides 60 of the primary pole piece 58. A coil assembly 88 including a bobbin 90 on which is wound a coil 92 is located within the annular space 82 and is connected to electrical connectors 94 for attachment of the EGR valve 10 to a source of external power, not shown. Also defined by the assembly of the primary and secondary pole pieces 58 and 70 is an axial chamber 96. The axial chamber 96 is defined by the inner walls 98 and 100 of the coaxially aligned primary and secondary poles 68 and 72, respectively and is configured to receive, for reciprocable travel therein, a substantially cylindrical armature 102. The armature has a centrally extending opening 104 which receives the distal end of the valve stem 34 which is fixed to the armature using a fastener 106. A valve return spring 108 seated between the armature 102 and the bearing member 54 operates to bias the armature 102 and its associated valve assembly 14 into a normally closed position, FIG. 1, relative to the valve seat 30. Critical to the functioning of the armature 102 within the solenoid 56 is the maintenance of a circumferential, primary air gap 110 between the outer circumferential surface 112 of the armature and the corresponding inner surfaces 98 and 100 of the poles 68 and 72, respectively. The air gap 110 is established by a sleeve member 114 which is disposed between the armature 102 and the poles 68,72 and is constructed of a non-magnetic material such as stainless steel or plastic.

Figure 2:
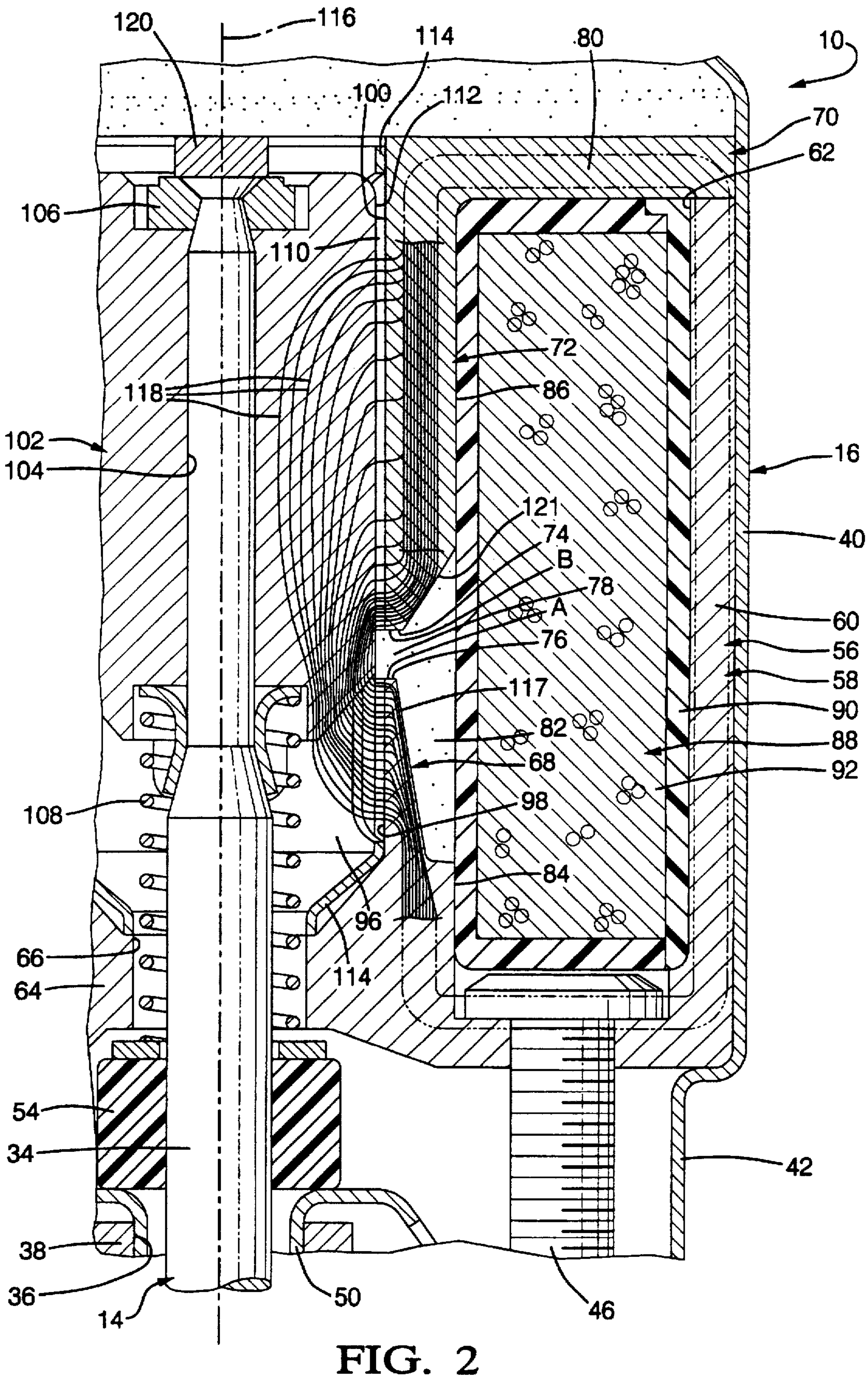
FIG. 2 is an enlarged view of a portion of the valve of FIG. 1.

In order to establish a linear relationship between force and current, over the range of valve motion, the outer wall 84 of the primary pole 68 is tapered outwardly from the actuator axis 116, FIG. 2, in a direction which is away from the pole-to-pole gap 78 such that as the armature 102 moves in the direction of the bottom 64 of the primary pole piece 58 so as to open the valve 32 off of the valve seat 30, the mass of the pole piece through which magnetic flux may pass from the armature 102 to the primary pole 68 is increased, thereby providing a desired linear displacement versus current characteristic. The tapered outer wall 117 of the primary pole 68 allows the inner wall 98 to remain substantially cylindrical defining the required, fixed air gap 110 with the armature 102 providing substantial controllability to the operation of the actuator and, hence, the EGR valve 10 since the force characteristics across the fixed gap 110 will not vary due to a changing gap dimension.

In order to provide a greater path for flux flow from the secondary pole piece 70 to the armature 102 across the fixed air gap 110 the pole-to-pole air gap 78 is minimized thereby maximizing axial length of the secondary pole 72 to thereby maximize the surface area between the opposing inner surface 100 of the secondary pole 72 and the outer surface 112 of the armature 102. By increasing the opposing surface area between the armature 102 and the secondary pole 72 the intensity of the magnetic flux transmitted from the secondary pole through the armature, which is proportional to the surface area of the cylindrical air gap 110 formed by the overlapping of the secondary pole 72 and armature 102, is maximized thereby providing maximum axial force generation by the solenoid actuator.

Minimizing the pole-to-pole air gap 78 will typically result in the lowering of the reluctance between the terminal ends 76 and 74 of the primary and secondary pole 68 and 72, respectively. A lowering of reluctance across gap 78 will cause a portion of the flux that would normally travel across fixed air gap 110 and through armature 102 to divert directly across the pole-to-pole gap 78 in the form of leakage flux. The leakage flux operates as a detriment to the solenoid axial force generation since it lessens the available flux 118 traveling from the secondary pole 72 through the armature 102. A tapered terminal end portion 120 of the secondary pole 72, combines with the tapered terminal end portion 76 of the primary pole piece 68 to reduce the pole-to-pole opposing surface areas "A" and "B" across the pole-to-pole gap.

Closing the actuator 40 is pintle position sensor 18. The pintle position sensor has a biased follower 120 which contacts the upper surface of the armature 102 and moves in concert with the valve shaft 34 to track its position and, as a result, the position of the valve head 32 relative to the valve seat 30. The position of the valve shaft 34 is translated into an electrical signal by the position sensor and transmitted, via the electrical connections 94 to an appropriate controller (not shown).

FIG. 1 shows the EGR valve 10 in a closed position as might be encountered during a wide-open throttle setting when exhaust gas is not required to be supplied to the engine intake. In the closed position, the coil 92 remains in a de-energized state and, as a result, no force generating magnetic flux fields are established. The spring 108 biases the armature 102 and attached valve assembly 14 into a closed position relative to the valve seat 30 to prevent the flow of exhaust gas from the exhaust source to the intake via the passage 28 in the base 12. Upon determination by an associated controller that engine operation conditions warrant the introduction of a metered quantity of EGR to the intake charge air, a current signal is transmitted to the coil to establish a magnetic flux field 118, FIG. 2, across the radial air gap 110. The flux transfer through the armature 102 induces a force in the opening direction of the valve urging the armature and valve assembly 14 to move off of its closed position relative to the valve seat 30, against the bias of spring 108, to allow exhaust gas to flow through the housing 20 from the exhaust source to the engine intake through passage 28. The extended length of the secondary pole 72 defines maximum overlap of the secondary pole 72 with the armature 102 thereby providing a low reluctance path for the transfer of flux across the fixed radial gap 110. The tapered terminal end portion 121 of the secondary pole 72 functions with the similarly tapered end portion 117 on the primary pole 68 to minimize the opposing surface areas across the pole-to-pole gap 78 which thereby minimizes the force limiting leakage flux across the pole-to-pole gap 78.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiment may be modified in light of the above teachings. The embodiment described was chosen to provide an illustration of the principles of the invention and of its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A valve assembly for metering exhaust gas to the intake of an internal combustion engine comprising an electromagnetic solenoid actuator having a magnetic circuit including primary and secondary poles defining an axial chamber and an armature, associated with a valve member, and moveable in said chamber, said primary pole defined by a center pole member including a cylindrical inner wall, open at a first end for receiving said moveable armature, said armature and said cylindrical inner wall defining a fixed, radially extending primary air gap for flux passage thereacross, and an outer wall extending in an outward taper from said first, open end of said center pole member, said outwardly tapering wall operable to increase the mass of the pole piece through which said magnetic circuit operates as said armature moves from said first, open end of said pole towards a second end, said secondary pole defined by a center pole member including a cylindrical inner wall, open at a first end, for receiving said moveable armature, said first end located in spaced opposing relationship to said first, open end of said primary pole to define a pole-to-pole gap therebetween, said armature and said cylindrical inner wall defining a fixed, radially extending primary air gap for flux passage thereacross, and an outer wall extending in an outward taper from said first, open end of said center pole., said outwardly tapering walls of said primary and said secondary poles operable to minimize the pole-to-pole gap through a minimization in opposing surface area between said first end of said primary pole and said first end of said secondary pole to thereby maximize the length of said secondary pole and the surface area between said secondary pole member and said armature to thereby minimize the reluctance across said radial air gap and maximize the passage of flux through said armature.

* * * * *